US012090622B2

(12) United States Patent
Allgaier

(10) Patent No.: US 12,090,622 B2
(45) Date of Patent: Sep. 17, 2024

(54) HANDLE DEVICE FOR A HAND-HELD POWER TOOL

(71) Applicant: Festool GmbH, Wendlingen (DE)

(72) Inventor: Benjamin Allgaier, Römerstein (DE)

(73) Assignee: Festool GmbH, Wendlingen (DE)

( * ) Notice: Subject to any disclaimer, the term of this patent is extended or adjusted under 35 U.S.C. 154(b) by 191 days.

(21) Appl. No.: 17/915,184

(22) PCT Filed: May 27, 2021

(86) PCT No.: PCT/EP2021/064252
§ 371 (c)(1),
(2) Date: Sep. 28, 2022

(87) PCT Pub. No.: WO2021/244947
PCT Pub. Date: Dec. 9, 2021

(65) Prior Publication Data

US 2023/0118707 A1 Apr. 20, 2023

(30) Foreign Application Priority Data

Jun. 5, 2020 (DE) ..................... 10 2020 115 087.3

(51) Int. Cl.
*B25F 5/02* (2006.01)

(52) U.S. Cl.
CPC .................................... *B25F 5/026* (2013.01)

(58) Field of Classification Search
CPC ......... B25F 5/026; B25B 21/02; B25B 21/00; B25B 21/026; B25B 23/16; B25B 23/147;
(Continued)

(56) References Cited

U.S. PATENT DOCUMENTS 3,537,336 A * 11/1970 Schmuck .............. B23B 49/006
408/72 R
4,276,675 A * 7/1981 Pioch ...................... F16B 7/048
74/544
(Continued)

FOREIGN PATENT DOCUMENTS

DE 38 29 801 A1 3/1990
DE 10 2006 041 069 A1 3/2008
(Continued)

*Primary Examiner* — Dariush Seif
(74) *Attorney, Agent, or Firm* — Hoffmann & Baron, LLP

(57) ABSTRACT

A handle device for releasable fastening on a hand-held power tool (10), wherein the handle device has a clamping ring (41) with a clamping mount (42) for receiving a fastening portion (20) of the hand-held power tool (10) and also has a handle (60), which projects from the clamping ring (41), wherein a clamping-actuation grip (78), which can be activated manually by the operator (BE), can be used to adjust the clamping mount (42) between a clamping position (K), and a release position (L), and wherein the handle device has an axial-form-fitting body (80), which is mounted in a movable manner in relation to the clamping mount (42) and has an axial-form-fitting contour (81) for engagement in a mating axial-form-fitting contour (25) of the fastening portion of the hand-held power tool. Provision is made for the handle device to have a form-fitting-actuation grip (90), which is separate from the clamping-actuation grip (78), can be activated manually by the operator (BE), independently of the clamping-actuation grip, and is intended for adjusting the axial-form-fitting body (80) between an engagement position, and a freeing position.

33 Claims, 3 Drawing Sheets

(58) Field of Classification Search
CPC ............ B25B 23/1475; B25B 23/1453; B25B 23/1405; B25B 19/00; B25D 11/04; B25D 11/066; B25D 16/00; B25D 16/003; B25D 16/006; B25D 2216/0023
USPC .......................... 173/117, 90, 91, 93, 94, 128
See application file for complete search history.

(56) References Cited

U.S. PATENT DOCUMENTS

| | | | | | |
|---|---|---|---|---|---|
| 4,820,090 | A * | 4/1989 | Chen | B25F 5/027 | 81/177.4 |
| 4,881,294 | A * | 11/1989 | Riedl | B25F 5/026 | 16/DIG. 40 |
| 5,049,012 | A * | 9/1991 | Cavedo | B25F 5/026 | 408/241 R |
| 6,241,594 | B1 * | 6/2001 | Lepold | B25F 5/026 | 81/177.8 |
| 6,553,627 | B1 * | 4/2003 | Horler | B25G 1/00 | 16/427 |
| D497,530 | S * | 10/2004 | Wu | D10/69 | |
| 8,371,708 | B2 * | 2/2013 | Nagasaka | B25B 23/18 | 173/217 |
| 8,407,860 | B2 * | 4/2013 | Brennenstuhl | B25F 5/026 | 16/422 |
| 9,149,876 | B2 * | 10/2015 | Nordgren | B23B 45/001 | |
| 9,950,411 | B1 * | 4/2018 | Clover | B25B 13/481 | |
| 10,710,172 | B2 * | 7/2020 | Carlson | B25F 5/026 | |
| 2004/0163214 | A1 * | 8/2004 | Cheng | B25F 5/026 | 16/426 |
| 2005/0082072 | A1 * | 4/2005 | Nicolantonio | B25F 5/026 | 173/162.2 |
| 2006/0219419 | A1 * | 10/2006 | Sugiyama | B25F 5/026 | 173/162.2 |
| 2007/0209162 | A1 * | 9/2007 | McRoberts | B25F 5/026 | 16/426 |
| 2008/0078067 | A1 * | 4/2008 | Nicolantonio | B25F 5/026 | 16/110.1 |
| 2009/0000434 | A1 * | 1/2009 | Shinma | B25D 17/04 | 81/491 |
| 2009/0178520 | A1 * | 7/2009 | Engelfried | B25F 5/026 | 81/489 |
| 2009/0283283 | A1 * | 11/2009 | Oesterle | B25F 5/006 | 173/162.2 |
| 2009/0307875 | A1 * | 12/2009 | Nakashima | B25F 5/026 | 16/436 |
| 2010/0005629 | A1 * | 1/2010 | Di Nicolantonio | B25F 5/026 | 16/426 |
| 2010/0064480 | A1 * | 3/2010 | Martin | B25F 5/026 | 16/426 |
| 2010/0064481 | A1 * | 3/2010 | Martin | B25F 5/026 | 16/426 |
| 2010/0064482 | A1 * | 3/2010 | Martin | B25F 5/026 | 16/426 |
| 2010/0206595 | A1 * | 8/2010 | Kamegai | B25F 5/006 | 173/162.2 |
| 2011/0011609 | A1 * | 1/2011 | Simm | B25F 5/026 | 173/171 |
| 2011/0120741 | A1 * | 5/2011 | Limberg | B25G 1/10 | 16/421 |
| 2011/0131766 | A1 * | 6/2011 | Imaschewski | B25F 5/026 | 16/426 |
| 2012/0312572 | A1 * | 12/2012 | Nemetz | B25F 5/006 | 248/220.22 |
| 2013/0025088 | A1 * | 1/2013 | Weiss | B25F 5/006 | 16/431 |
| 2013/0042730 | A1 * | 2/2013 | Griffin | F16B 2/08 | 81/489 |
| 2014/0020210 | A1 | 1/2014 | Brennenstuhl et al. | | |
| 2014/0138114 | A1 * | 5/2014 | Takeuchi | B23Q 11/0071 | 173/198 |
| 2014/0196921 | A1 * | 7/2014 | Kondo | B25G 1/00 | 173/46 |
| 2014/0223695 | A1 * | 8/2014 | Rieger | B25F 5/006 | 16/421 |
| 2014/0251649 | A1 * | 9/2014 | Kondo | B25F 5/026 | 16/426 |
| 2014/0352114 | A1 * | 12/2014 | Yoshikane | B25D 17/04 | 16/426 |
| 2015/0174753 | A1 * | 6/2015 | Kamiya | B25F 5/02 | 16/426 |
| 2015/0209952 | A1 * | 7/2015 | Nishii | B25F 5/026 | 173/162.2 |
| 2015/0266176 | A1 * | 9/2015 | Takeuchi | B25D 17/24 | 173/117 |
| 2016/0114472 | A1 * | 4/2016 | Holubarsch | B25F 5/026 | 16/426 |
| 2018/0050447 | A1 * | 2/2018 | Geiger | B25F 5/006 | |
| 2019/0255687 | A1 * | 8/2019 | Schneider | B25D 11/04 | |
| 2020/0198100 | A1 * | 6/2020 | Schneider | B25B 23/16 | |
| 2020/0262037 | A1 * | 8/2020 | Schneider | B25B 21/026 | |
| 2023/0118707 | A1 * | 4/2023 | Allgaier | B25F 5/026 | 16/426 |

FOREIGN PATENT DOCUMENTS

| | | | |
|---|---|---|---|
| DE | 10 2008 000 516 | A1 | 9/2009 |
| DE | 10 2011 010 039 | A1 | 8/2012 |
| DE | 10 2016 207 755 | A1 | 11/2017 |
| WO | 2009/109247 | A1 | 9/2009 |

* cited by examiner

HANDLE DEVICE FOR A HAND-HELD POWER TOOL

This application is a National Stage application based on International Application No. PCT/EP2021/064252, filed May 27, 2021, which claims priority to DE 102020115087.3, filed Jun. 5, 2020.

BACKGROUND OF THE INVENTION

The invention relates to a handle device for releasable fastening on a hand-held power tool, in particular a power drill or a power screwdriver wherein the handle device has a clamping ring with a clamping mount for receiving a fastening portion, in particular a machine neck, of the hand-held power tool and a handle which projects from the clamping ring and which is provided and designed for gripping and/or grasping by an operator, wherein, using a clamping-actuation grip which can be manually actuated by the operator, the clamping mount can be adjusted between a clamping position clamping the fastening portion of the hand-held power tool, clamping position in which an inner circumferential surface of the clamping mount lies in the clamping seat against the fastening portion of the hand-held power tool, and a release position which releases the fastening portion of the hand-held power tool, release position in which the fastening portion of the hand-held power tool can be inserted into the clamping mount along an insertion axis, and wherein the handle device has an axial-form-fitting body mounted in a movable manner in relation to the clamping mount and having an axial-form-fitting contour for engagement in a mating axial-form-fitting contour of the fastening portion of the hand held power tool.

A handle device of this type is described in DE 38 29 801 A1, for example. The handle device has a sleeve with a so-called locking tab as axial-form-fitting contour, which, by adjusting the clamping mount into the clamping position, engages in a groove on the spindle neck of the hand-held power tool. The clamping mount enables a friction-locking clamping hold of the handle device on the hand-held power tool. The axial-form-fitting contour is used for additional axial-form-fitting locking or fixing with respect to the insertion axis. For adjusting the handle device with respect to the hand-held power tool, for example, with respect to the rotational position relative to the insertion axis and/or for releasing the handle device, the clamping seat must be released, in that, during an initial rotational actuation stage of a handle, the clamping mount is adjusted into the release position. In addition, the axial form fit also has to be eliminated using a subsequent rotational actuation portion of a handle.

DE 10 2008 000 516 A1 and WO 2009/109247 A1 describe a hand-held power tool with a spring element which, as axial-form-fitting body, projects in a resiliently yielding manner into the clamping mount.

Additional handle devices are known from DE 10 2006 041 069 A1 or DE 10 2016 207 755 A1.

In the known handle devices, the handling is uncomfortable.

SUMMARY OF THE INVENTION

Therefore, the aim of the present invention is to propose an improved handle device.

To achieve the aim, in a handle device of the type mentioned at the beginning, it is provided that the handle device has a form-fitting actuation grip, which is separate from the clamping-actuation grip and which can be manually actuated by the operator independently of the clamping-actuation grip, in order to adjust the axial-form-fitting body between an engagement position, in which the axial-form-fitting contour is engaged with the mating axial-form-fitting contour and locks the handle device with respect to the insertion axis in a form-fitting manner on the fastening portion of the hand-held power tool, and a release position, in which the axial-form-fitting contour is disengaged from the mating axial-form-fitting contour, and the hand-held power tool and the holding device can be displaced relative to one another with respect to the insertion axis.

Here, a basic idea is that the clamping ring can be adjusted with the clamping-actuation grip between the clamping position and the release position, and the axial-form-fitting contour can be actuated independently of and/or separately from the clamping-actuation grip or the clamping ring using the form-fitting actuation grip. Thus, there are two actuation grips which are independent of one another and/or which can be manually actuated separately.

The axial-form-fitting contour is mounted in a manner so that it can be moved and/or actuated independently of the clamping ring and/or the clamping mount. The axial-form-fitting contour is mounted in a manner so that it can be moved relative to the clamping mount.

The axial-form-fitting contour is preferably designed as a rib. The mating axial-form-fitting contour is designed, for example, as a groove, in particular as an annular groove.

On the axial-form-fitting contour and/or on the mating axial-form-fitting contour, inclined surfaces or insertion bevels can be provided, which facilitate insertion into one another of the axial-form-fitting contour and the mating axial-form-fitting contour.

When the clamping mount is in release position and/or when the clamping ring is in release position, it is advantageously provided that the axial-form-fitting contour can be adjusted using the form-fitting actuation grip between the engagement position and the release position. It is possible that the clamping between the handle device and the hand-held power tool can be released, that is to say the clamping ring can be adjusted into its release position, while the axial-form-fitting contour remains engaged with the mating axial-form-fitting contour of the fastening portion of the hand-held power tool.

It is advantageous if the axial-form-fitting contour in the engagement position fixes the handle device with respect to the insertion axis on the fastening portion in an axially nondisplaceable and/or in a form-fitting manner and/or is designed for such fixing. Thus, for example, a transverse width of the axial-form-fitting contour and of the mating axial-form-fitting contour can be identical with respect to the insertion axis, except for a clearance for movement, which enables insertion into one another of the axial-form-fitting contours. Thus, when the axial-form-fitting contour is engaged in the mating axial-form-fitting contour, the handle device cannot be displaced with respect to the fastening portion along the insertion axis.

It is advantageously provided that the axial-form-fitting contour projects in the engagement position in front of the inner circumferential surface of the clamping mount. This design of the axial-form-fitting contour is advantageous whenever the clamping mount is in the clamping position. However, it is particularly advantageous if the axial-form-fitting contour in the engagement position projects in front of the inner circumferential surface of the clamping mount when the clamping mount is in its release position. Thus, for example, the clamping mount can be released or become released without the axial form fit being eliminated. The axial form fit between the handle device and the hand-held power tool can thus be maintained even when the clamping is released.

It is advantageously provided that the axial-form-fitting contour projects farther in front of the inner circumferential surface of the clamping device in the engagement position than in the release position.

It is provided that, in the release position, the axial-form-fitting contour does not project in front of the inner circumferential surface of the clamping device and/or is flush with the inner circumferential surface and/or is set back behind the inner circumferential surface of the clamping mount. All the aforementioned designs can be implemented, for example, in that a travel range of the axial-form-fitting contour between the engagement position and the release position is of suitable extent. Thereby, for example, multiple release positions can thus also be provided. It is possible, for example, that the axial-form-fitting contour in fact also still projects in front of the inner circumferential surface of the clamping mount in the release position but is no longer engaged/with the mating axial-form-fitting contour. By a suitable travel range of the axial-form-fitting contour, said contour can, for example, be adjusted still farther away from the inner circumferential surface of the clamping mount, so that the axial-form-fitting contour is flush with the inner circumferential surface or is set back behind said inner circumferential surface.

It is advantageous if, in the engagement position, the axial-form-fitting contour projects radially inward in front of an annular or circular insertion cross section of the clamping mount and, in the release position, is set back behind the insertion cross section or is flush with the insertion cross section, so that, in the release position of the axial-form-fitting contour the clamping mount provides or frees a circular insertion cross section for the insertion of the fastening portion of the hand-held power tool.

The clamping mount has a cylindrical shape, for example.

Here, it should be mentioned that the insertion cross section of the clamping mount is preferably circular and/or has a diameter of exactly or approximately 43 mm. Thus, the handle device is compatible with a plurality of hand-held power tools, the fastening portion of which has a clamping part whose outer circumference is approximately circular and/or has a diameter of approximately 43 mm. Even if the hand-held power tool does not have a matching mating axial-form-fitting contour, the axial-form-fitting contour of the handle device does not interfere when it assumes its release position or is adjusted into the release position.

Preferably, the clamping ring as a whole and/or in the region of the clamping mount is electrically nonconductive or electrically insulating. Advantageously, at least the clamping mount is electrically insulating or electrically nonconductive. For example, the clamping mount or the clamping ring as a whole is made of a plastic material, in particular an electrically nonconductive plastic material. A metal clamping ring which directly provides the clamping mount would also be easily possible. For electrical insulation, the metal clamping ring can be designed with an electrically insulating coating in the region of the clamping mount.

The axial-form-fitting body is preferably a separate body from the clamping ring. The axial-form-fitting body is preferably a separate body from the clamping ring. The axial-form-fitting body is preferably not integral with the clamping ring.

Preferably, the axial-form-fitting body can be adjusted independently of the clamping-actuation grip between the engagement position and the release position and/or is not movement-coupled and/or not in actuation engagement with the clamping-actuation grip.

Provision is preferably made so that the axial-form-fitting body can be actuated exclusively by the form-fitting actuation grip between the engagement position and the release position, in particular from the engagement position into the release position and/or from the release position into the engagement position.

It is advantageous if the axial-form-fitting body cannot be actuated by the clamping-actuation grip. Thereby, for example, the clamping-actuation grip can thus be adjusted into a position associated with the clamping position of the clamping mount and/or into a position associated with the release position of the clamping mount, without, in such an adjustment, the axial-form-fitting body being adjusted between the engagement position and the release position.

Advantageously, the axial-form-fitting body can be adjusted between the engagement position and the release position when the clamping mount is in the clamping position. Thus, the axial-form-fitting body can also be adjusted into the release position when the clamping ring clamps the fastening portion of the hand-held power tool.

It is understood that multiple axial-form-fitting contours can be provided, i.e., at least two axial-form-fitting contours. These axial-form-fitting contours can be provided on one and the same axial-form-fitting body. However, it is also possible that multiple axial-form-fitting bodies are provided.

For the actuation of the at least one axial-form-fitting body, a single form-fitting actuation grip can be provided. The form-fitting actuation grip is connected, for example, by a transmission, a driver arrangement or the like, to one axial-form-fitting body or to multiple axial-form-fitting bodies. However, it is also possible that multiple form-fitting actuation grips are provided for one axial-form-fitting body or for multiple axial-form-fitting bodies. Thus, for example, an operator, by operating different form-fitting actuation grips, for example, two different form-fitting actuation grips, can simultaneously actuate one and the same axial-form-fitting body or multiple axial-form-fitting bodies.

It is advantageous if the axial-form-fitting body and the form-fitting actuation grip are firmly or integrally connected to one another. Alternatively, it is also possible that, for example, a driver device and/or a transmission or the like is/are arranged between the at least one form-fitting actuation grip and the at least one axial-form-fitting body. The driver device can be or comprise, for example, a transmission. The driver device can also comprise a clearance between the axial-form-fitting body and the form-fitting actuation grip.

It is in fact possible that the axial-form-fitting body can be or is to be manually actuated from the engagement position into the release position and vice versa from the release position into the engagement position. However, it is preferable if the axial-form-fitting body is loaded by a spring arrangement into the engagement position. Thus, the operator actuates the axial-form-fitting body against the force of the spring arrangement in the direction of the release position, while the spring arrangement acts in the opposite direction, that is to say in the direction of the engagement position. For example, the axial-form-fitting body is designed as a latch member which is loaded in the direction of the engagement position.

The spring arrangement comprises, for example, a coil spring and/or a metal spring. It is preferable if the spring arrangement is passed through or penetrated by a tensioning anchor in order to adjust the clamping ring between the release position and the clamping position.

Advantageously, the spring arrangement comprises a separate spring separate from the axial-form-fitting body.

The spring arrangement is preferably not formed by a resilient linkage of the axial-form-fitting body and/or by a separate spring from the axial-form-fitting body. Therefore, the axial-form-fitting body itself does not have a resilient property, for example, in that it is linked in a resiliently movable manner on another body, for example, on the clamping ring.

Naturally, it is also possible for the spring arrangement to be formed by a spring-elastic linkage of the axial-form-fitting body, for example, on a base body of the clamping ring, or to comprise such a spring-elastic linkage.

It is preferable for the axial-form-fitting body to be mounted so that it can be displaced linearly relative to the clamping ring along a setting axis. The spring or spring arrangement acts in particular on the axial-form-fitting body in the direction of the setting axis. It is possible for the axial-form-fitting body to be mounted so that it can be displaced relative to the clamping ring exclusively linearly along one or more setting axes. Furthermore, it is possible that the axial-form-fitting body cannot be rotated or cannot be pivoted relative to the clamping ring. Advantageously, the axial-form-fitting body is mounted so that, relative to the clamping ring, it can be displaced exclusively linearly but not pivoted.

Alternatively, a pivotable mounting or a displaceable-pivotable mounting or a mounting along a curved track of the axial-form-fitting body between the engagement position and the release position would also be possible. For example, the axial-form-fitting body is then mounted so that it can be pivoted using a pivot bearing or mounted using a slide guide along a curved track and/or so that it can be displaced-pivoted between the release position and the engagement position. The pivot bearing can have, for example, an axle member which is connected to the axial-form-fitting body and which is mounted on a bearing mount so that it can be pivoted about a pivot axis.

For the provision of the displaceable mounting of the axial-form-fitting body, a guide device or a linear bearing is preferably provided. Preferably, on the handle and/or on the clamping ring, a guide device for the linear guiding of the axial-form-fitting body along the setting axis is provided and/or arranged. For example, guide surfaces of the guide device can be arranged both on the clamping ring and on the handle, in particular on a support body of the handle, on which the axial-form-fitting body is linearly mounted with respect to the setting axis.

The setting axis extends preferably tangentially and/or at a radial spacing tangentially with respect to the inner circumferential surface of the clamping mount.

It is advantageous if the axial-form-fitting contour has an inclined surface or wedge-shaped surface for application and/or for the wedging with the mating axial-form-fitting contour, for example, the bottom thereof. The bottom is, for example, a groove bottom of a mating axial-form-fitting contour designed as grooves. It is particularly advantageous if the axial-form-fitting body is designed as wedge body or has a wedge body which is designed and/or provided for wedging with the mating axial-form-fitting contour of the hand-held power tool. The inclined surface or wedge-shaped surface is preferably inclined flat with respect to the setting axis. For example, the inclined surface or wedge-shaped surface has a relative inclination of less than 30°, in particular less than 25°, preferably even less than 20° or less than 15°. The inclined surface or wedge-shaped surface and the setting axis are thus angled with respect to one another at such an angle. Here, it should be mentioned that the inclined surface or wedge-shaped surface can also have a curved shape or curved portions. Therefore, the inclined surface or wedge-shaped surface does not have to be a planar surface or flat surface.

Due to the inclined slope of the wedge-shaped surface or inclined surface, for example, a setting force acting along the setting axis is increased with respect to a contact pressure which the axial-form-fitting body acts on the mating axial-form-fitting contour. A spring force of the spring arrangement acting, for example, on the axial-form-fitting body generates a contact pressure on the mating axial-form-fitting contour, for example, on the bottom thereof, which is reinforced by the aforementioned small angle between, on the one hand, the inclined surface or wedge-shaped surface, and, on the other hand, the setting axis, in particular reinforced by a multiple. The tangential force introduction of the axial-form-fitting body is thus reinforced so to speak.

A preferred concept provides that the handle has a longitudinal central axis with respect to which the setting axis is parallel or coaxial.

An advantageous measure provides that the axial-form-fitting contour is mounted so that it can be displaced tangentially with respect to the inner circumferential surface of the clamping mount and/or with respect to a center of the clamping mount.

The clamping-actuation grip and the form-fitting actuation grip are preferably mounted so that they can be moved with respect to the clamping ring with different degrees of freedom of movement, i.e., for example, the clamping-actuation grip can rotate with respect to the clamping ring, and the form-fitting actuation grip can be displaced relative to the clamping ring. Thus, an embodiment example provides for adjusting the clamping mount between the clamping position and the release position, the clamping-actuation grip is mounted so that it can rotate with respect to the clamping ring, and, for adjusting the axial-form-fitting body between the engagement position and the release position, the form-fitting actuation grip is mounted so that it can be displaced with respect to the clamping ring. However, in principle, it would also be conceivable for the form-fitting actuation grip to be also mounted so that it can rotate with respect to the clamping ring, in order to adjust the axial-form-fitting contour between the engagement position and the release position. Here, it is possible that a rotational movement of the form-fitting actuation grip is converted by a transmission into a linear movement of the form-fitting contour.

The axial-form-fitting body and the clamping-actuation device are advantageously coaxially arranged, in particular with respect to a tensioning axis which remains to be explained below and/or with respect to a longitudinal axis of a tensioning anchor which also remains to be explained below.

The clamping-actuation grip is advantageously formed by a rod-shaped handle body of the handle, which can be grasped by an operator with the inner surface of his/her hand, or it has such a handle body. The handle body thus forms a part, in particular an essential part or main part, of the handle, which projects from the clamping ring and which can be grasped and/or gripped by the operator for holding and guiding the hand-held power tool.

By exchanging the handle body, for example, or by using different handle bodies, the handle can have different geometric shapes, for example, different diameters, and/or can be designed with different lengths. Thus, ergonomic adaptations can easily be implemented.

It is advantageous if the form-fitting actuation grip is arranged between the clamping-actuation grip and the clamping ring. Thereby, the operator can thus actuate the clamping-actuation grip or the handle body while grasping the form-fitting actuation grip, for example, with the thumb and/or index finger.

An advantageous concept provides that, between a gripping portion of the clamping-actuation grip, for example, of the aforementioned handle body, provided for grasping the clamping-actuation grip, and a gripping surface of the form-fitting actuation grip, provided for the manual actuation, a spacing is provided which corresponds approximately to the spacing between an anterior phalanx of the thumb of a hand of an adult operator and an index finger of the same hand when the thumb is splayed out from the hand. The operator can thus grasp the handle portion of the clamping-actuation grip and at the same time actuate the form-fitting actuation grip with the anterior phalanx of the thumb. The operator can, for example, axially displace the form-fitting actuation grip toward the handle portion of the clamping-actuation grip, in particular for the actuation of the axial-form-fitting body in the direction of the release position.

On a side facing the form-fitting actuation grip, the handle body of the clamping-actuation grip preferably has a supporting protrusion, in particular a flange protrusion, on which the hand of an operator can be supported, in particular for the actuation of the form-fitting actuation grip.

It is advantageous if the form-fitting actuation grip is designed as a ring body or sleeve body. In particular, such a sleeve body had a gripping surface provided for actuation by the operator, which extends rising toward its side facing away from the clamping ring and/or which comprises a recessed grip.

The clamping-actuation grip is preferably supported on the clamping ring independently of the form-fitting actuation grip.

A tensioning anchor is advantageous for the actuation of the clamping ring. For example, the clamping ring can be adjusted by a tensioning anchor between the clamping position and the release position. The tensioning anchor can be actuated linearly along a tensioning axis by a handle body of the clamping-actuation grip, for example, by the aforementioned handle body. The handle body is preferably mounted so that it can rotate about the tensioning axis on a base body of the handle and it forms the clamping-actuation body. On the tensioning anchor, for example, a threaded portion is provided, which is screwed into a screw mount which is connected in a rotationally fixed manner to the handle body. By a rotational actuation of the handle body, the tensioning anchor can be linearly adjusted relative to the screw mount in order to adjust the clamping ring between the clamping position and the release position.

The tensioning anchor, just like the aforementioned handle body, is preferably exchangeable.

By means of tensioning anchors of different lengths, it is possible to design, for example, a length of the handle differently and/or to implement larger or smaller spacings between the clamping ring and the clamping-actuation grip, in particular the handle body. For example, spacers, in particular the support body mentioned in the detailed description, having different lengths can be arranged between the clamping-actuation grip and the form-fitting actuation grip, in particular spacers which are penetrated by the tensioning anchor.

The tensioning anchor is, for example, a rod-shaped or bolt-shaped component. For the adjustment, the tensioning anchor can tension, for example, opposing ring ends of the clamping ring toward one another in the direction of the clamping position, and, for the release of the clamping, that is to say in the direction of the release position, it can release said opposing ring ends to move apart from one another or actively adjust the ring ends apart from one another in the direction of the release position.

The tensioning anchor thus extends, for example, between the clamping ring and the clamping-actuation grip, in particular the handle body thereof.

It is advantageous if the axial-form-fitting body is passed through by the tensioning anchor and/or guided on the tensioning anchor. The tensioning anchor can thus at the same time form a guide element or the already mentioned guide device for the axial-form-fitting body.

A preferred embodiment provides that the handle device has at least one rotational-form-fitting contour for engagement in a mating rotational-form-fitting contour on the fastening portion of the hand-held power tool, wherein the mating rotational-form-fitting contour and the rotational-form-fitting contour, when engaged with one another, fix the handle device in a rotationally fixed manner relative to the fastening portion of the hand-held power tool with respect to the insertion axis. The rotational-form-fitting contour and the mating rotational-form-fitting contour, for example, can be engaged and disengaged, for example, by a relative movement of fastening portion and handle device along the insertion axis. The rotational-form-fitting contour and the mating rotational-form-fitting contour, for example, are designed in the form of rib structures, tooth structures or the like or they comprise such structures. For example, a circular toothing can be provided as rotational-form-fitting contour and as mating rotational-form-fitting contour. In particular, the rotational-form-fitting contours are designed so that the handle device can be secured with respect to the insertion axis in a rotationally fixed manner in at least two, preferably multiple angle positions relative to the fastening portion.

For example, the rotational-form-fitting contour is arranged on a front side of the clamping ring, which is passed through by the insertion axis. It is advantageous, in particular, if respective rotational-form-fitting contours are provided on mutually opposite front sides of the clamping ring. Thus, the handle device can be fastened on the fastening portion in mounting positions which are opposite one another, wherein the rotational-form-fitting contours engage together. In the two mounting positions, the handle projects from the fastening portion of the hand-held power tool respectively on another one of the sides opposite one another.

It is advantageous if, in the engagement position, the axial-form-fitting contour fixes the handle device with respect to the insertion axis on the fastening portion in an axially nondisplaceable and/or form-fitting manner so that the rotational-form-fitting contour is held engaged with the mating rotational-form-fitting contour and/or it is designed for such fixing. For example, a spacing of the axial-form-fitting contour from the rotational-form-fitting contour or the spacings from the rotational-form-fitting contours are dimensioned on the mutually opposite front sides of the clamping ring is/are dimensioned so that, in the engagement position, the axial-form-fitting contour fixes the handle device with respect to the insertion axis on the fastening portion in an axially nondisplaceable and/or form-fitting manner, in such a manner that the rotational-form-fitting contour is held engaged with the mating rotational-form-fitting contour when the handle device is mounted on the fastening portion.

An advantageous concept provides that the axial-form-fitting contour, in its engagement position engaging in the mating axial-form-fitting contour or in an intermediate position between the engagement position and the release position, holds the handle device with respect to the insertion axis so that it can be axially displaced by a predetermined adjustment range but is held captive on the fastening portion. For example, it is possible that, in the engagement position, the axial-form-fitting contour holds the handle device with respect to the insertion axis in a nondisplaceable manner on the fastening portion and, in the release position, enables a removal of the handle device from the fastening portion, while in the intermediate position, a part or a segment of the axial-form-fitting contour engages in the mating axial-form-fitting contour but allows a clearance for axial movement of the handle device relative to the fastening portion of the hand-held power tool with respect to the insertion axis.

For example, a transverse width of the mating axial-form-fitting contour with respect to the insertion axis can be dimensioned and/or provide the adjustment range so that the axial-form-fitting contour in fact engages in the mating axial-form-fitting contour but is accommodated therein so that in can be moved along the insertion axis in the engagement position or the aforementioned intermediate position. It is also possible that such an axial mobility or the adjustment range is implemented by, for example, an inclined contour of the axial-form-fitting contour, which runs out inclined toward a free end region or front region of the axial-form-fitting contour and/or by a holding protrusion of the axial-form-fitting contour which protrudes from a base body of the axial-form-fitting contour, or the like.

Preferably, in the engagement position or in particular in the aforementioned immediate position, the axial adjustment range is dimensioned so that the rotational-form-fitting contour of the handle device and the mating rotation form-rotation contour of the fastening portion can be disengaged from or engaged with one another. Therefore, the axial-form-fitting contour thus indeed engages in the mating axial-form-fitting contour, so that the handle device is held captive on the fastening portion. The handle device can nevertheless be moved from the mating rotational-form-fitting contour along the insertion axis, so that it can rotate about the insertion axis.

The hand-held power tool is preferably a power drill or a power screwdriver. The hand-held power tool advantageously forms a part of a system which comprises the hand-held power tool as well as the handle device. A work tool which can be attached on the hand-held power tool is preferably a drilling tool or a screwing tool.

BRIEF DESCRIPTION OF THE DRAWINGS

Below, an embodiment example of the invention is explained in reference to the drawing. The figures show.

DETAILED DESCRIPTION

Figure 1:
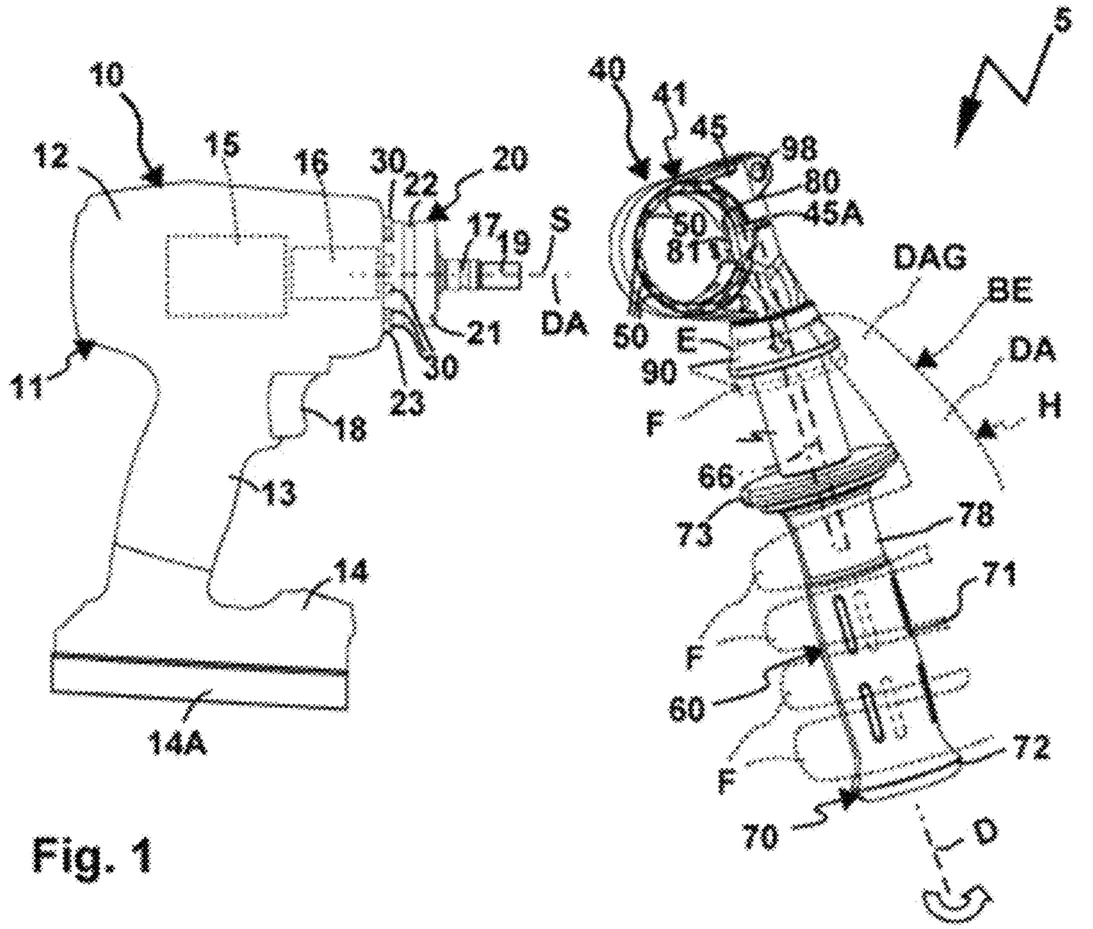
FIG. 1 a system with a hand-held power tool as well as a handle device.

A system 5 comprises a hand-held power tool 10, for example, a screwing device, as well as a handle device 30.

A machine housing 11 of the hand-held power tool 10 comprises a drive portion 12, from which a handle portion 13 projects. On the free foot portion 14 of the handle portion 13, which faces away from the drive portion 12, an energy storage 14A, for example, a rechargeable battery pack, for the electrical energy supply of the hand-held power tool 10 can be detachably arranged. As an alternative to the mobile energy storage 14A or in addition thereto, the hand-held power tool 10 can also have a mains connection, in particular a mains cable, for connection to an electrical power grid.

In the drive portion 12, a drive motor 15, for example, an electrical or pneumatic drive motor is arranged, which, directly or via a transmission 16, has a tool mount 17 for the arrangement of a work tool 19, for example, a screwing tool or a drilling tool. The drive motor 12 drives the tool mount 17, for example, about a rotation axis DA.

The drive motor 15 can be switched on and off by means of a switch 18, and in particular it can also be varied with regard to its rotational speed.

The tool mount 17 is provided on a fastening portion 20, for example, on a so-called machine neck, of the hand-held power tool 10.

On the fastening portion 20, along an insertion axis S, objects can be inserted, for example, drill stands and in particular the handle device 40 explained below.

The fastening portion 20 has a receiving portion 21 which extends between a free front side 22 of the fastening portion 20, on which the tool mount 17 is arranged, to a front side 23 of the machine housing 11, in particular of the drive portion 12. The receiving portion 21 has a cylindrical shape with respect to the insertion axis S. The receiving portion 21 has a holding surface 24 which is designed as an outer cylindrical surface with respect to the insertion axis S or which is an outer cylindrical surface extending about the insertion axis S. The holding surface 24 is suitable as clamping surface. The front side 23 is at an angle, for example, at a right angle, with respect to the holding surface 24.

For the form-fitting fastening of objects on the fastening portion 21 parallel to the insertion axis S, a mating axial-form-fitting contour 22 is provided on the holding surface 24. The mating axial-form-fitting contour 25 is provided on the receiving portion 21 between the front sides 22 and 23. The mating axial-form-fitting contour 25 is designed, for example, as a groove 26 which has a bottom 27, from which side walls or support surfaces 28 extend away to the holding surface 24, for example, at a right angle.

Preferably, the mating axial-form-fitting contour 25 extends around the entire outer circumference of the receiving portion 21 with respect to the insertion axis S. However, it would also be possible for a mating axial-form-fitting contour to extend only over a partial circumference of the receiving portion 21. Advantageously, multiple mating axial-form-fitting contours can also be provided, which, for example, with respect to the insertion axis S, are arranged next to one another and/or in circumferential direction with respect to the insertion axis S, next to one another on the receiving portion 21. Mating axial-form-fitting contours arranged next to one another with respect to the insertion axis S can be designed, for example, in the manner of a rib structure which comprises two or more receiving grooves. Mating axial-form-fitting contours arranged next to one another in circumferential direction with respect to the insertion axis S on the receiving portion 21 can each extend, for example, around an angular section about the insertion axis S, for example, can be designed as partially annular receiving grooves.

For the form-fitting hold of objects on the fastening portion 20 in circumferential direction or rotational direction with respect to the insertion axis S, rotational-form-fitting contours 30 are used. The rotational-form-fitting contours 30 project, for example, in front of the front side 23 toward the holding surface 24 and/or radially outward in front of the holding surface 24. The rotational-form-fitting contours 30 have, for example, multiple form-fitting protrusions 31 projecting parallel to the insertion axis S in front of the front side 23. The rotational-form-fitting contours 30 have identical radial spacings 32 with respect the insertion axis S, so that objects to be fastened on the fastening portion 20 can be fastened in multiple angular positions, the angular spacings of which correspond to the spacings 32.

The fastening portion 20 is provided on a fastening body 35 of the hand-held power tool 10, fastening body which forms a component of the machine housing 11 or is connected thereto. The fastening body 35 comprises a circumferential wall 36, the radial outer circumference of which provides the holding surface 24, as well as a front wall 37 which protrudes in the manner of a flange in front of the circumferential wall 36, front wall on which the front side 23 is provided.

Figure 2:
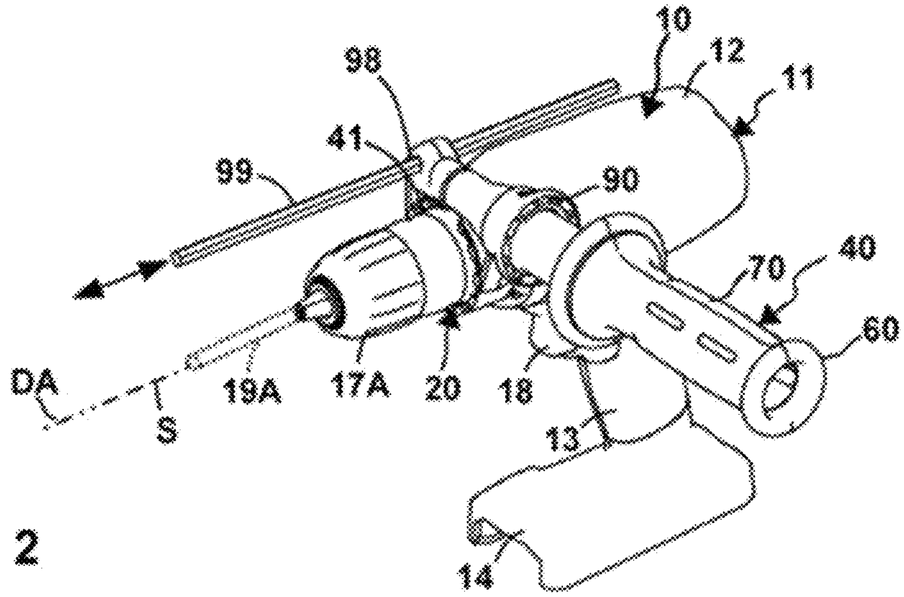
FIG. 2 the system according to FIG. 1, wherein the handle device is mounted on the hand-held power tool, FIG. 3 a front portion of the handle device according to preceding figures in an oblique perspective view, FIG. 4 an alternative axial-form-fitting body for the handle device according to FIG. 3, FIG. 5 the handle device according to preceding figures as well as a machine neck of the hand-held power tool, FIG. 6 an exploded representation of the handle device according to preceding figures, FIG. 7 a section through the handle device according to FIG. 5, for example, approximately along a cutting line A-A in FIG. 5, in an engagement position of its axial-form-fitting body, FIG. 8 a partial view of the handle device according to FIG. 7, wherein the axial-form-fitting body is adjusted into a release position, FIG. 9 a cross-sectional view of the handle device according to FIG. 7, approximately along a cutting line B-B in FIG. 7, interacting with a fastening portion of the hand-held power tool which has a modified mating axial-form-fitting contour.
Figure 3:
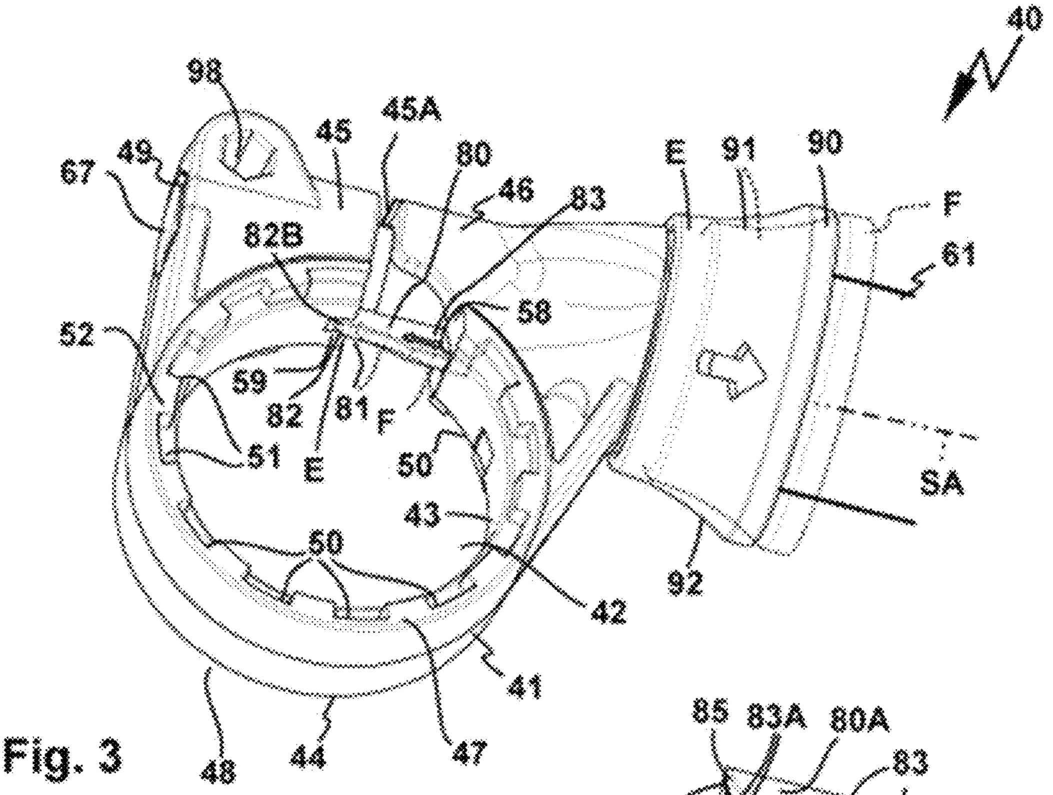

On the tool mount 17, an attachment 17A, for example, a drill chuck, an angle attachment or the like, can be arranged. On the attachment 17A, for example, a drill chuck according to FIG. 2, a work tool 19A, for example, a drill, can be detachably fastened. Precisely for a drilling operation, it is essential that the operator can securely grip the hand-held power tool, in order to hold the forces occurring during the drilling operation. For this purpose, the hand-held power tool can be gripped not only on its machine housing 11, for example, on the handle portion 13 and optionally also on the drive portion 12, but additionally also by means of the handle device 40 which can be detachably connected to the hand-held power tool 10.

The handle device 40 comprises a clamping ring 41 for fastening on the hand-held power tool 10. The clamping ring 41 comprises a clamping mount 42 into which the fastening portion 20 of the hand-held power tool 10 can be inserted along the insertion axis S. The clamping mount 42 has a cylindrical inner circumferential surface 43, in particular a clamping surface, which is provided and designed for clamping with the holding surface 24 of the hand-held power tool 10. When the clamping mount 42 lies in the clamping seat against the holding surface 24, the handle device 40 is held in a friction-locking manner on the hand-held power tool 10.

Figure 7:
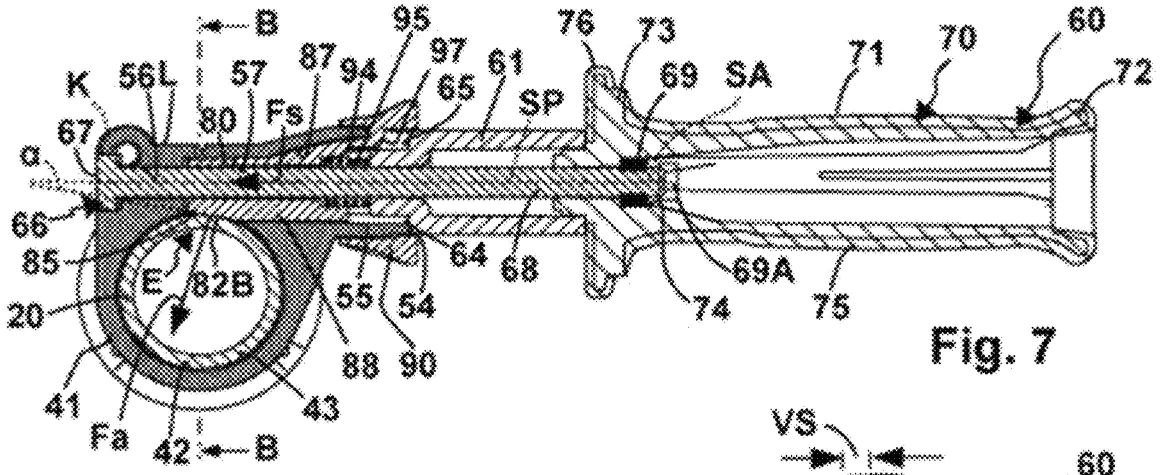
Figure 8:
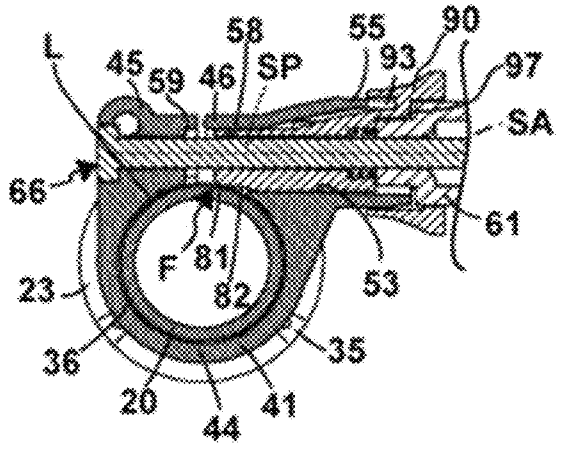

The clamping ring 41 has a ring body 44 which delimits the clamping mount 42. The ring body 44 has a circumference-side slot 45A, by means of which an insertion cross section of the clamping mount 42 can be adjusted with respect to the insertion axis S. The slot 45A extends radially with respect to the insertion axis S. Ring ends 45 and 46 of the ring body 44 lie opposite one another in the region of the slot 45A. The insertion cross section of the clamping mount 42 can be decreased with respect to the insertion axis S by actuating the ring ends 45 and 46 of the clamping ring 41 toward one another along a tensioning axis SP in order to clamp the fastening portion 20 of the hand-held power tool in a clamping position K which can be established thereby. The clamping position K is represented in FIG. 7 with dashed lines. When the ring ends 45 and 46 are moved away from one another, the insertion cross section of the clamping device 42 is increased and adjusted into a release position L which is represented with solid lines in FIG. 7 and in the fastening portion 20 can be displaced with respect to the insertion axis S in the clamping mount 42.

A non-rotatable hold of the clamping ring 41 on the fastening portion 20 with respect to the insertion axis S is ensured by rotational-form-fitting contours 50 provided on mutually opposite front sides 47 and 48 of the clamping ring 41, for engagement of the rotational-form-fitting contours 30 of the hand-held power tool. 10. By providing rotational-form-fitting contours 50 on each front side 47 and 48 of the clamping ring 41, the rotational-form-fitting contours 30 of the fastening portion 20 can each be engaged with the rotational-form-fitting contours 50 of the handle device 40 in each insertion direction with respect to the insertion axis S.

The rotational-form-fitting contours 50 comprise form-fitting accommodations 51 for engagement of the form-fitting protrusions 31 which have angular spacings 52 with respect to the insertion axis S, which correspond to the spacings 32. It is advantageous if, in the region of the ring ends 45 and 46 of the clamping ring 41, the form-fitting mounts 51 have an angular width with respect to the insertion axis S in order to enable a clearance for movement of the clamping ring 41 during the adjustment from the release position L into the clamping position K with respect to the rotational-form-fitting contours 30 in the region of the ring ends 45 and 46.

A handle 60 protrudes from the clamping ring 41. The handle 60 has a support body 61 which is supported on the clamping ring 41. The support body 61 comprises a sleeve body 62 in front of which a support protrusion 63 projects. The support protrusion 63 projects toward an accommodation 53 on the ring end 46 of the ring body 44. A support contour 64 of the support body 61 is supported, with respect to the tensioning axis SP, on a support contour 54 of the clamping ring 41. The support contour 54 is designed, for example, on the front side of a circumferential wall 55 of the accommodation 53, but it could also easily comprise a step in the interior of the accommodation 53.

For adjusting the clamping ring 41 between the clamping position K and the release position L, a tensioning anchor 66 is used, which passes through the clamping ring 41 in the region of the ring ends 45 and 46, in order to move the ring ends 45 and 46 toward one another so as to adjust the clamping mount into the clamping position K or to allow or bring about a movement of the ring ends 45 and 46 away from one another so as to adjust in the direction of the release position L. The tensioning anchor 66 has a head 67 which is accommodated on the ring end 45 in a rotationally fixed manner in an accommodation 49 and arranged on a bolt portion 68. The head 67 and the accommodation 49 have, for example, mutually complementary, in particular polygonal, rotation preventing contours.

The bolt portion 68 passes through passage openings 56 and 57 on the ring ends 45 and 46 as well as through the support body 61 and engages with a free ring end in an insertion opening 77 of a handle body 70 of the handle 60. On the free end of the bolt portion 68, a threading is provided, which is screwed into a nut 69 which is accommodated in a rotationally fixed manner in the handle body 70.

Furthermore, it is advantageous if, on the free end of the bolt portion 68, a stop 69A, for example, a nut secured in a rotationally fixed manner, a flange protrusion, or the like, is arranged, which limits the travel range of the nut 69 along the bolt portion 68, so that the nut 69 cannot get lost and/or the bolt portion 68 cannot be unscrewed completely from the nut 69. Therefore, the stop 69A thus forms a type of loss prevention device for the nut 69.

The handle 60 and in particular the handle body 70 have a longitudinal shape and extend along a longitudinal central axis LM of the handle 60.

The handle body 70 can rotate relative to the support body 61 and relative to the ring body about a rotation axis D which is preferably coaxial with respect to the tensioning axis SP and/or coaxial with respect to the longitudinal central axis LM, whereby the nut 69 is screwed along the bolt portion 68, and thus the head 67 of the tensioning anchor 66 which forms a counter-bearing body is moved toward or away from the handle body 70. Thereby, the ring end 45 is actuated toward the ring end 46 into the clamping position K or it actuated or released for movement away from the ring end 46 in the direction of the release position. A hand H of an operator BE can rotate, for example, the handle portion 71 using multiple fingers F grasping the handle body 70 and thus rotate the nut 69 about the rotation axis D. The handle body 70 forms a clamping-actuation grip 78 for adjusting the clamping mount 42 between the release position L and the clamping position K.

Naturally, instead of the nut 69, a threading for screwing the bolt portion 68 in can also be provided directly or integrally on the handle body 70. Furthermore, the handle body 70 can also have a screw protrusion which is screwed into a screw mount on the ring end 45 of the ring body 44, in order to bring about a tensioning/actuation with respect to the tensioning axis SP.

The handle body 70 has a gripping portion 71 to be grasped by an operator. The gripping portion 71 extends between support protrusions 72 and 73 on the free end region of the handle 60 and respectively facing the support body 61. The support protrusions 72 and 73 are designed in the manner of flange protrusions. The handle body 70 moreover has a holding mount 74 for the nuts 69.

In the region of the gripping portions 71 and/or of the support protrusions 72, an elastic layer 75 is preferably provided.

On the support protrusion 73, a reinforcing body 76 is advantageously provided, by means of which the handle body 70 is supported on the support body 61.

For the axial-form-fitting locking or fastening of the handle device 40 with respect to the insertion axis S on the fastening mount 20 of the hand-held power tool 10, an axial-form-fitting body 80 is used, which has an axial-form-fitting contour 81 for engaging in the mating axial-form-fitting contour 25 of the fastening portion 20. The axial-form-fitting contour 81 has a front surface 82 which, when the axial-form-fitting contour 81 is engaged with the mating axial-form-fitting contour 25, faces the bottom 27 of the groove 26 or is supported on the bottom 27. Support surfaces 83, for example, side flanges or side walls, extend away from the front surface 82 at an angle, preferably at a right angle, which are provided for form-fitting support on the support surfaces 28 of the groove 26.

The axial-form-fitting body 80 is mounted so that it can be displaced using a guide device 87 along a setting axis SA between an engagement position E in which the axial-form-fitting contour 81 is engaged with the mating axial-form-fitting contour 25 or groove 26 and a release position L in which the axial-form-fitting body 80 or the axial-form-fitting contour 81 is disengaged from the mating axial-form-fitting contour 25.

The front surface 82 is sloped inclined with respect to the setting axis SA and forms an inclined surface 82B or has an inclined surface as an insertion bevel 82B. The insertion bevel 82B facilitates engagement of the axial-form-fitting contour 81 with the mating axial-form-fitting contour 25.

As component of the guide device 87, for example, the tensioning anchor 87 can be used, which penetrates a passage opening 86 of the axial-form-fitting body 80. The axial-form-fitting body 80 is mounted so that it can be shifted along the tensioning anchor 87 with respect to the setting axis SA.

Moreover, the accommodation 53 on the clamping ring 41 is designed for accommodating and/or guiding the axial-form-fitting body 80. The axial-form-fitting body 80 is accommodated in the accommodation 53 and/or guided along the setting axis SA.

A substantially cylindrical portion 88 of the axial-form-fitting body 80 is accommodated, for example, in a substantially cylindrical guide accommodation 58 on the ring end 46.

In the release position F, the axial-form-fitting body 80 is located exclusively in the guide accommodation 58 and/or is retracted into the guide accommodation 58. In the engagement position E, the axial-form-fitting body 80 projects in front of the guide accommodation 58 and is sunken into a support accommodation 59 on the ring end 47, support accommodation which faces the guide accommodation 58 and is flush with it. In principle, the axial-form-fitting body 80 could also engage, in case of appropriate length, at least partially in the support accommodation 59 in the release position F. The support accommodation 59 and the guide accommodation 58 preferably have the same cross sections transversely to the setting axis SA. Thus, in the engagement position E, the axial-form-fitting body 80 is supported on both ring ends 46 and 47 transversely to the insertion axis S and can thus optimally support the handle device 40 on the fastening portion 20 of the hand-held power tool 10 with respect to forces acting axially in the direction of the insertion axis S.

Furthermore, the axial-form-fitting body 80 is preferably guided in a rotationally fixed manner with respect to the setting axis SA on the handle device 40, for example, with respect to the clamping ring 41. For this purpose, the axial-form-fitting body 80 has, for example, rotation prevention contours 89, in particular guide protrusions projecting radially outward with respect to the insertion axis S and engaged with mating rotation prevention contours 59A, for example, grooves, slots or other similar guide mounts. The rotation prevention contours 89 and the mating rotation prevention contours 59A extend parallel to the setting axis SA and preferably have a longitudinal shape with respect to said axis.

For the actuation of the axial-form-fitting body 80, a form-fitting actuation grip 90 is used. In principle, the form-fitting actuation grip 90 could in fact be movement-coupled with the axial-form-fitting body 80, for example, by driver contours which engage together, but it is preferably integral with the axial-form-fitting body 80.

The form-fitting actuation grip 90 comprises a gripping piece 91, designed as sleeve body 91A, which is arranged on the end region of the portion 88 of the axial-form-fitting body 80 facing away from the axial-form-fitting contour 81. The gripping piece 91 has a gripping surface 92 which preferably has an inclined shape and/or a recessed grip. The gripping surface 92 rises from the clamping ring 41 in the direction of the handle body 70. Thus the gripping surface 92 can conveniently be gripped by a thumb DA of the operator BE and can be actuated in the direction of the handle body 60 along the setting axis SA when the operator BE grasps the handle body 60 with his/her other fingers F.

On its side facing the clamping ring 41, the form-fitting actuation grip 90 has an accommodation 93 in which the circumferential wall 55 which borders the accommodation 53 on the clamping ring 41 engages. These components which engage together can form a component of the guide device 87. In any case, in the engagement position E, the circumferential wall 55 engages in the accommodation 93 of the gripping piece 91. It is advantageous if the circumferential wall 55 also still engages at least partially in the accommodation 93 in the release position F.

The axial-form-fitting body 80, and thus the axial-form-fitting contour 81, is spring-loaded into the engagement position E by a spring arrangement 95. The spring arrangement 95 comprises a spring 96, for example, a coil spring. The spring arrangement 95 is supported, on the one hand, in an accommodation 94 on the axial-form-fitting body 80, for example, on the longitudinal end region of the portion 88 facing the handle body 70, and, on the other hand, on the support body 61, for example on the support protrusion 63 thereof, in particular on the front side of the support protrusion 63. The axial-form-fitting body is thus to be actuated against the force of the spring arrangement 85 from the engagement position E into the release position F. The release position F is associated with a stop 65 which is fixed with respect to the handle 60. The stop 65 is formed or provided, for example, by the support contour 64 of the support body 61, against which a stop 97 of the gripping piece 91 strikes in the release position F.

So that the axial-form-fitting contour 81 can be easily engaged with the groove 26, on the front surface 82, an inclined surface 84 rising toward the free end 85 of the axial-form-fitting body 80 is provided, so that the free end 85 has a greater spacing from the clamping mount 42 or inner circumferential surface 43 than the region of the front surface 82 facing the portion 88 of the axial-form-fitting body 80.

Advantageously, on the front surface 82, a rounded region 82A is provided, the rounding of which corresponds approximately to the rounding of the inner circumferential surface 43, so that the region 82A in the engagement position E can lie in a form fitting manner on the bottom 27 of the groove 26.

On the front surface 82, an inclined surface or wedge-shaped surface 82B is moreover formed, which, for the purpose of wedging with the mating axial-form-fitting contour 25, can be engaged with same. The wedge-shaped surface 82B is inclined at an angle α with respect to the setting axis SP. The angle α is a flat angle of approximately 5° to 25°, for example, in the present case approximately 10° to 15°. Due to the wedge-shaped surface 82B, a setting force Fs acting along the setting axis SP and generated, for example, by the spring arrangement 95, is converted into a contact pressure Fa which acts on the bottom 27 of the mating axial-form-fitting contour 25. The flat inclination of the wedge-shaped surface 82B, hence the small angle α, here brings about a force reinforcement, i.e., the clamping force Fa is greater, in particular greater by a multiple, than the setting force Fs.

Advantageously, the handle device 40 has a depth stop element 99 for setting a penetration depth of the work tool 19 or 19A into a work piece. The depth stop element 99 is, for example, a rod which is accommodated so that it can be displaced parallel to the insertion axis S in an accommodation 98 of the handle device 40. The accommodation 98 is provided on the clamping ring 41, in particular on the ring end 45.

When the handle device 40 is to be removed from the hand-held power tool 10, it is provided that the clamping mount 42 is first adjusted from the clamping position K into the release position L. For this purpose, a slight rotation of the handle body 70, that is to say of the clamping-actuation grip 78, about the rotation axis D is sufficient. The operator then releases the form-fitting locking by adjusting the axial-form-fitting body 80 from the engagement position E into the release position F, in that the operator adjusts the form-fitting actuation grip 90 in the direction of the handle body 70, for example, by means of an anterior phalanx of the thumb DAG of his/her thumb DA. For this purpose, a short travel range is sufficient. Then, the operator can remove the handle device 40, for example, completely from the fastening portion 20 of the hand-held power tool 10, and thus pull it off along the insertion axis S so to speak.

It is also possible that the operator only partially adjusts the handle device 40 along the insertion axis S, so that the rotational-form-fitting contours 30, 50 become disengaged and the handle device 40 can rotate about the insertion axis S with respect to the hand-held power tool 10. If the appropriate angular position of the handle device 40 with respect to the machine housing 11 has been set, the handle device 40 is adjusted again in the direction of the insertion axis S toward the machine housing 11, wherein the rotational-form-fitting contours 30, 50 engage with one another. Advantageously, the axial-form-fitting body 80 also snaps into the mating axial-form-fitting contour 25 due to the force application of the spring arrangement 95.

Figure 9:
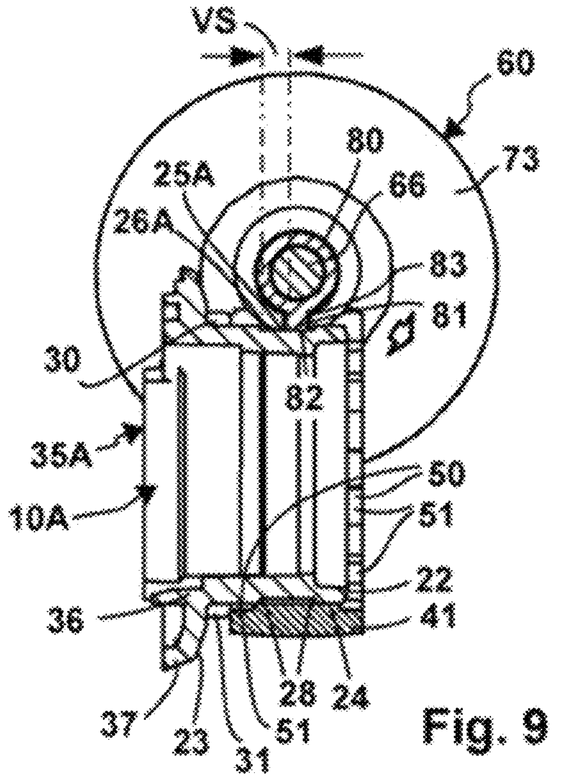

A concept represented in FIG. 9 provides that the axial-form-fitting body 80 is provided only as an additional safety measure for the clamping of the handle device 40 on the hand-held power tool 10, measure which just prevents a complete removal of the handle device 40 from the hand-held power tool 10. In FIG. 9, elements described so far have the same design; in particular the hand-held device 40 is not modified, while an alternative fastening body 35A or an alternative hand-held power tool 10A equipped therewith is provided. Instead of the mating axial-form-fitting contour 25, a mating axial-form-fitting contour 25A which is broader with respect to the insertion axis S and with a broader groove 26A is provided, the support surfaces 28A of which have a greater spacing with respect to the insertion axis S than the support surfaces 28. Thereby, the handle device 40, after release of the clamping of the clamping mount 42, that is after the adjustment thereof into the release position L, can be displaced along the insertion axis S on the holding surface

24 but only so far that the axial-form-fitting body 80 strikes in a form-fitting manner against one of the support surfaces 28A. The width of the groove 26A or of the mating axial-form-fitting contour 25A with respect to the insertion axis S is dimensioned so that, by an axial displacement of the handle device 40 and of the hand-held power tool 10A along the insertion axis S relative to one another over an adjustment range VS, the rotational-form-fitting contours 30, 50 can be disengaged or engaged, whereas the handle device 40 can be removed from the hand-held power tool 10A only if the axial-form-fitting body 80 is adjusted into the release position F, in which it no longer engages in the mating axial-form-fitting contour 25A. It is understood that alternatively or additionally to this solution, for example, a width of the axial-form-fitting contour 81 with respect to the insertion axis S can also be varied so that, for example, in the engagement position E as well, the axial-form-fitting body 80 has a clearance for movement with respect to the insertion axis S in the groove 26 or mating axial-form-fitting contour 25, clearance which makes it possible to engage or disengage the rotational-form-fitting contours 30, 50.

Figure 4:
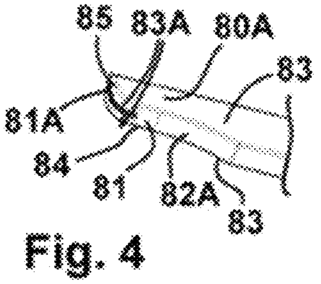
Figure 5:
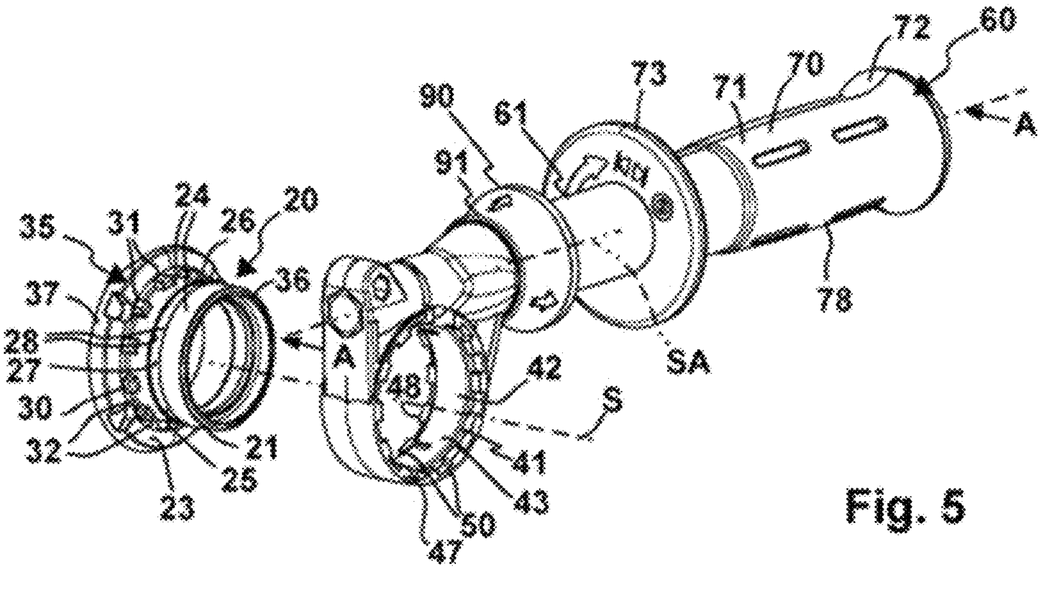
Figure 6:
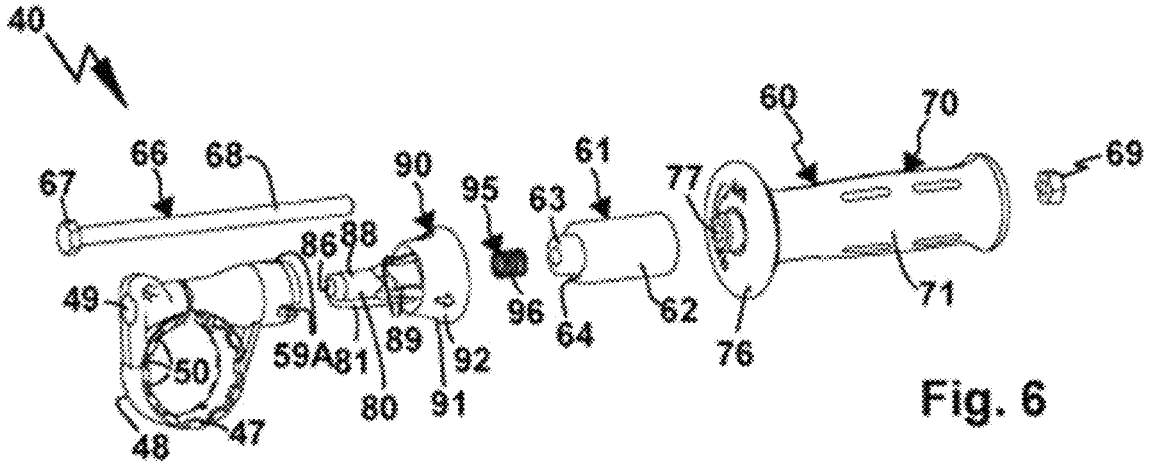

In an axial-form-fitting body 80A represented in FIG. 4, the two solutions explained so far in a manner of speaking are connected with one another, namely, on the one hand, in that the axial-form-fitting body 80A, in the engagement position E, at least with the support surface 83 having the larger spacing from the mating rotational-form-fitting contours 30 in the respective mounting position of the handle device 40 on the hand-held power tool 10, lies on the support surface 28 of the groove 26 farthest from the mating rotational-form-fitting contours 30 and thus, even in the case of an adjustment of the clamping ring 41 into the release position L, brings about a form-fitting hold of the handle device 40 on the hand-held power tool 10 with respect to the insertion axis S both in radial direction and in axial direction of the insertion axis S. Furthermore, the axial-form-fitting body 80A can also be adjusted into the release position F using the form-fitting actuation grip 90, in which it no longer engages in the mating axial-form-fitting contour 25, so that the handle device 40 can be completely removed from the hand-held power tool.

Moreover, an intermediate position Z of the axial-form-fitting body 80 between the engagement position E and the release position F can be set, in which a holding contour 81A which projects, for example, in front of the inclined surface 84 is still engaged with the mating axial-form-fitting contour 25. The holding contour 81A is designed, for example, as a holding protrusion, in particular as a rib, an inclined surface, or the like, which projects in front of the front surface 82 but which, with respect to the insertion axis, has a spacing from the support surfaces 83. When the axial-form-fitting body 80A is adjusted into the intermediate position Z, the handle device 40 with respect to the insertion axis S has a clearance for movement such that the support surfaces 83A of the holding protrusion or of the holding contour 81A can be displaced between the support surfaces 28 of the groove 26 with respect to the insertion axis S, so that the rotational-form-fitting contours 30 and 50 can be disengaged and engaged, but the handle device 40 nevertheless cannot be removed from the fastening portion 20 of the hand-held power tool 10.

The invention claimed is:

1. A handle device for releasable fastening on a hand-held power tool, wherein the handle device has a clamping ring with a clamping mount for receiving a fastening portion, of the hand-held power tool and a handle which projects from the clamping ring and which is provided and designed for gripping and/or grasping by an operator, wherein, using a clamping-actuation grip which can be manually actuated by the operator, the clamping mount can be adjusted between a clamping position clamping the fastening portion of the hand-held power tool, in which clamping position an inner circumferential surface of the clamping mount lies in the clamping seat against the fastening portion of the hand-held power tool, and a release position which releases the fastening portion of the hand-held power tool, in which release position the fastening portion of the hand-held power tool can be inserted into the clamping mount along an insertion axis, and wherein the handle device has an axial-form-fitting body mounted in a movable manner in relation to the clamping mount and having an axial-form-fitting contour for engagement in a mating axial-form-fitting contour of the fastening portion of the hand held power tool and wherein said handle device has a form-fitting actuation grip, which is separate from the clamping-actuation grip and which can be manually actuated by the operator independently of the clamping-actuation grip, for adjusting the axial-form-fitting body between an engagement position, in which the axial-form-fitting contour is engaged with the mating axial-form-fitting contour and locks the handle device with respect to the insertion axis in a form-fitting manner on the fastening portion of the hand-held power tool, and a release position (F), in which the axial-form-fitting contour is disengaged from the mating axial-form-fitting contour, and the hand-held power tool and the holding device can be displaced relative to one another with respect to the insertion axis.

2. The handle device according to claim 1, wherein the axial-form-fitting contour can be adjusted between the engagement position and the release position when the clamping mount, is in the release position.

3. The handle device according to claim 1 wherein, in the engagement position, the axial-form-fitting contour projects in front of the inner circumferential surface of the clamping mount when the clamping mount is in the release position.

4. The handle device according to claim 1, wherein, in the engagement position, the axial-form-fitting contour fixes the handle device with respect to the insertion axis in an axially nondisplaceable and/or form-fitting manner.

5. The handle device according to claim 1, wherein the axial-form-fitting body and the form-fitting actuation grip are firmly or integrally connected to one another or movement-coupled by a driver device.

6. The handle device according to claim 1, wherein the axial-form-fitting body is loaded by a spring arrangement into the engagement position.

7. The handle device according to claim 1, wherein the axial-form-fitting body is mounted so that it can be linearly displaced relative to the clamping ring along a setting axis.

8. The handle device according to claim 7, wherein, on the handle and/or on the clamping ring, a guide device for linearly guiding the axial-form-fitting body along the setting axis is provided.

9. The handle device according to claim 7, wherein the setting axis extends tangentially or at a radial spacing tangentially with respect to the inner circumferential surface of the clamping mount.

10. The handle device according to claim 7, wherein the axial-form-fitting contour has a sloped inclined surface or wedge-shaped surface which is inclined flat and/or inclined at an angle (α) of less than 30° with respect to the setting axis for application and/or wedging with the mating axial-form-fitting contour.

11. The handle device according to claim 7, wherein the handle has a longitudinal central axis with respect to which the setting axis is parallel or coaxial.

12. The handle device according to claim 7, wherein the axial-form-fitting body is mounted in an exclusively linearly displaceable and/or non-pivotable or non-rotatable manner relative to the clamping ring.

13. The handle device according to claim 1, wherein, with respect to the inner circumferential surface of the clamping mount and/or with respect to a center of the clamping mount, the axial-form-fitting contour is mounted so that it can be displaced relatively and/or tangentially between the engagement position and the release position.

14. The handle device according to claim 1, wherein, for adjusting the clamping mount between the clamping position and the release position, the clamping-actuation grip is mounted so that it can rotate with respect to the clamping ring, and, for adjusting the axial-form-fitting body between the engagement position and the release position, the form-fitting actuation grip is mounted so that it can be displaced with respect to the clamping ring.

15. The handle device according to claim 1, wherein the clamping-actuation grip is formed by a rod-shaped handle body of the handle, which can be grasped by the operator with the inner surface of his/her hand, or it has such a handle body.

16. The handle device according to claim 1, wherein the form-fitting actuation grip is arranged between the clamping ring and the clamping-actuation grip.

17. The handle device according to claim 1, wherein, between a gripping portion of the clamping-actuation grip, provided for grasping the clamping-actuation grip, and a gripping surface of the form-fitting actuation grip, provided for the manual actuation, a spacing is provided which corresponds approximately to the spacing between the anterior phalanx of the thumb of a hand of an adult operator and an index finger of the hand when the thumb is splayed out from the hand, so that the operator can actuate the form-fitting actuation grip while grasping the gripping portion of the clamping-actuation grip with the anterior phalanx of the thumb.

18. The handle device according to claim 1, wherein the form-fitting actuation grip is designed as a ring body or a sleeve body.

19. The handle device according to claim 1, wherein the clamping ring can be adjusted by a tensioning anchor between the clamping position and the release position.

20. The handle device according to claim 19, wherein the axial-form-fitting body is passed through by a tensioning anchor and/or guided on the tensioning anchor.

21. The handle device according to claim 19 wherein the tensioning anchor can be adjusted linearly along a tensioning axis by a handle body of the clamping-actuation grip.

22. The handle device according to claim 21, wherein a threaded portion of the tensioning anchor is screwed into a screw mount of the handle body, so that, by the rotational actuation of the handle body, the tensioning anchor is linearly adjustable relative to the screw mount, wherein a stop is provided which blocks a complete unscrewing of the tensioning anchor from the screw mount.

23. The handle device according to claim 1, wherein the handle device comprises at least one rotational-form-fitting contour for engagement in a mating rotational-form-fitting contour on the fastening portion of the hand-held power tool, wherein the mating rotational-form-fitting contour and the rotational-form-fitting contour, when engaged with one another, fix the handle device in a rotationally fixed manner relative to the fastening portion of the hand-held power tool with respect to the insertion axis.

24. The handle device according to claim 1, wherein the axial-form-fitting contour, in its engagement position engaging in the mating axial-form-fitting contour or in an intermediate position between the engagement position and the release position, holds the handle device with respect to the insertion axis so that it can be axially displaced by a predetermined adjustment range but is held captive on the fastening portion.

25. The handle device according to claim 24, wherein the adjustment range is dimensioned so that the rotational-form-fitting contour and the mating rotational-form-fitting contour can be disengaged from or engaged with one another.

26. The handle device according to claim 1, wherein, for the adjustment between the clamping position and the release position, the ring body of the clamping ring has ring ends which can be adjusted toward one another and apart from one another, and wherein the axial-form-fitting body is supported on one or both ring ends and/or mounted in such a manner that it can be moved between the engagement position and the release position.

27. The handle device according to claim 1, wherein the axial-form-fitting body is a separate body from the clamping ring and/or is not integral with the clamping ring.

28. The handle device according to claim 1, wherein the axial-form-fitting body can be adjusted independently of the clamping-actuation grip between the engagement position and the release position and/or is not movement-coupled and/or in actuation engagement with the clamping-actuation grip.

29. The handle device according to claim 1, wherein the axial-form-fitting body can be actuated exclusively by the form-fitting actuation grip between the engagement position and the release position and/or cannot be actuated by the clamping.

30. The handle device according to claim 1, wherein the form-fitting actuation grip has a gripping surface which rises toward the clamping-actuation grip and/or which is suitable for engaging behind, so that an operator whose hand grasps the clamping-actuation grip with their hand surface can actuate the gripping surface with a finger projecting from the hand surface of the hand, in order to adjust the axial-form-fitting body into the release position.

31. The handle device according to claim 1, wherein the axial-form-fitting body can be adjusted between the engagement position and the release position when the clamping mount is in the clamping position.

32. The handle device according to claim 1, wherein the axial-form-fitting body has an insertion bevel, on the front side, and/or front surface, which, in the engagement position, faces a bottom of the mating axial-form-fitting contour or is supported on the bottom, wherein the front surface has a region, the contour of which corresponds approximately to the contour of the clamping mount in the region of the axial-form-fitting body and/or has a rounding corresponding to the clamping mount.

33. A hand-held power tool with a handle device according to claim 1.

* * * * *